United States Patent
Kuge et al.

(10) Patent No.: US 12,517,588 B2
(45) Date of Patent: Jan. 6, 2026

(54) HAPTIC DEVICE AND HAPTIC METHOD

(71) Applicant: ALPS ALPINE CO., LTD., Tokyo (JP)

(72) Inventors: Yoshihiro Kuge, Miyagi (JP);
Kazuhiro Takahashi, Miyagi (JP);
Yukimitsu Yamada, Miyagi (JP);
Hideo Kawase, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/080,040

(22) Filed: Mar. 14, 2025

(65) Prior Publication Data

US 2025/0216945 A1 Jul. 3, 2025

Related U.S. Application Data

(63) Continuation of application No. PCT/JP2023/030634, filed on Aug. 25, 2023.

(30) Foreign Application Priority Data

Oct. 14, 2022 (JP) ................................ 2022-165386

(51) Int. Cl.
*G06F 3/01* (2006.01)
*G06F 3/0362* (2013.01)

(52) U.S. Cl.
CPC ............ *G06F 3/016* (2013.01); *G06F 3/0362* (2013.01)

(58) Field of Classification Search
CPC ......... G06F 3/016; G06F 3/0362; G05G 1/08; G05G 5/03; H01H 9/16; H01H 19/20
See application file for complete search history.

(56) References Cited

U.S. PATENT DOCUMENTS

2010/0271340 A1  10/2010 Nagashima et al.
2018/0080511 A1*  3/2018 Takahashi ............. F16D 57/002
(Continued)

FOREIGN PATENT DOCUMENTS

JP   2010-257052   11/2010
JP   2013-127705   6/2013
(Continued)

OTHER PUBLICATIONS

International Search Report for PCT/JP2023/030634 mailed on Oct. 24, 2023.

*Primary Examiner* — Premal R Patel
(74) *Attorney, Agent, or Firm* — IPUSA, PLLC

(57) ABSTRACT

Haptic device includes: detection part for detecting operation part's rotation position; biasing part for biasing operation part along operation part's rotation direction based on drive signal; signal generation part for generating drive signal for driving biasing part based on rotation position; and low-pass filter part for outputting drive signal to biasing part by attenuating high-frequency component. Signal generation part generates drive signal for causing biasing to other side in rotation direction when rotation position is between first and second positions, and for causing biasing to one side when rotation position is between first and third positions. Low-pass filter part attenuates drive signal's high-frequency component more strongly when rotation position is in first range including first position and not including second and third positions than when in second range including second position and outside first range or third range including third position and outside first and second ranges.

11 Claims, 13 Drawing Sheets

(56) References Cited

U.S. PATENT DOCUMENTS

| | | | |
|---|---|---|---|
| 2019/0333720 A1* | 10/2019 | Ka | G06F 3/0362 |
| 2020/0150766 A1* | 5/2020 | Bagley | G06F 3/016 |
| 2023/0162929 A1* | 5/2023 | Taylor | H01H 13/14 |
| | | | 200/341 |

FOREIGN PATENT DOCUMENTS

| | | |
|---|---|---|
| JP | 2019-053744 | 4/2019 |
| WO | 2018/135371 | 7/2018 |

* cited by examiner

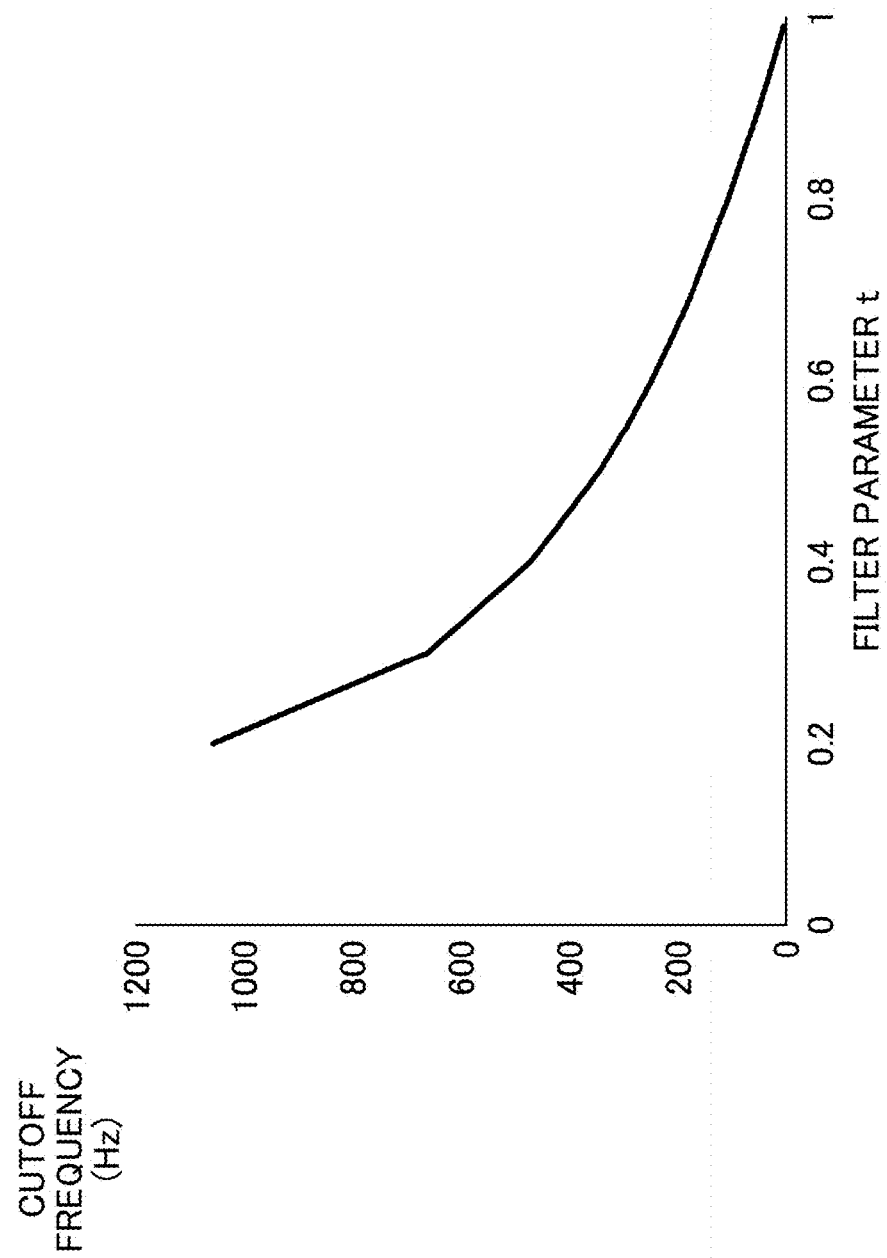

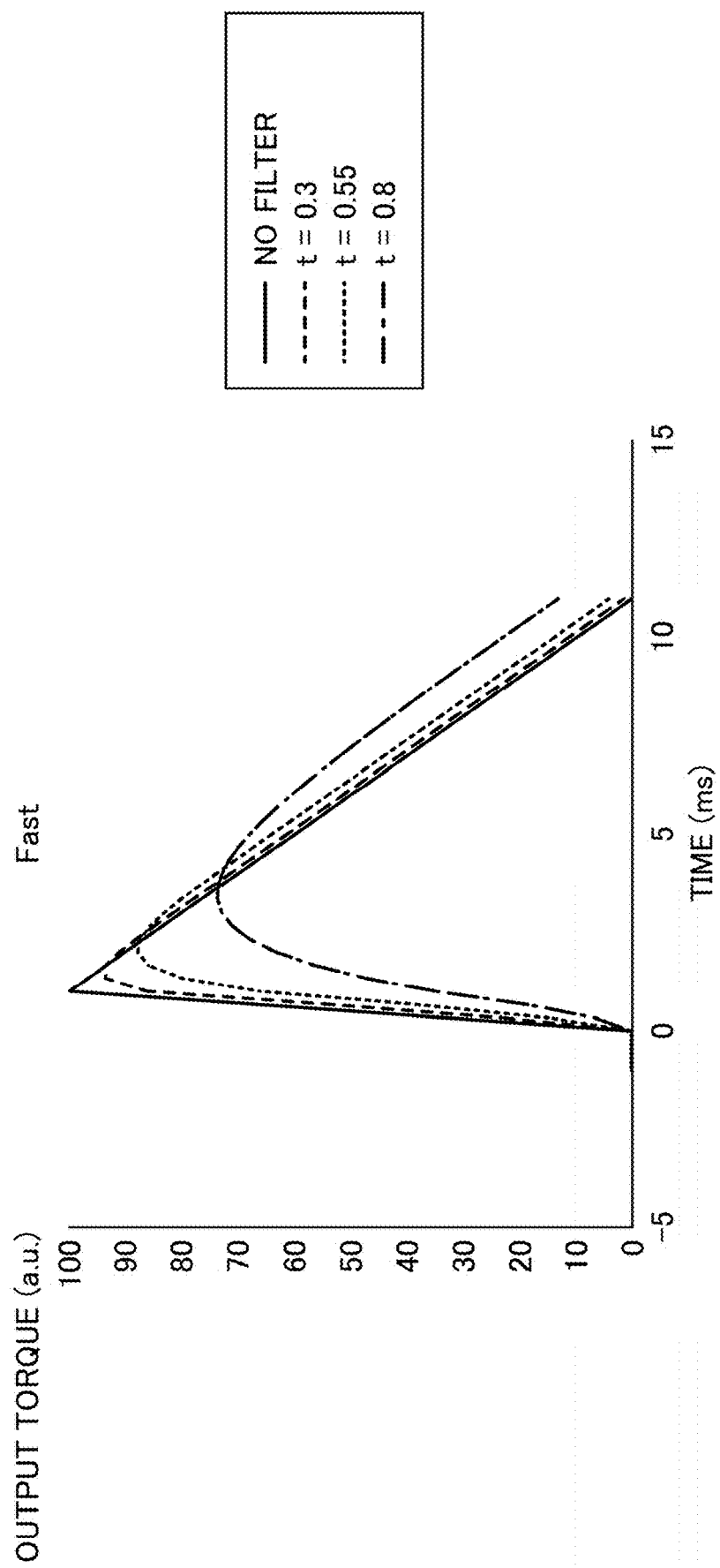

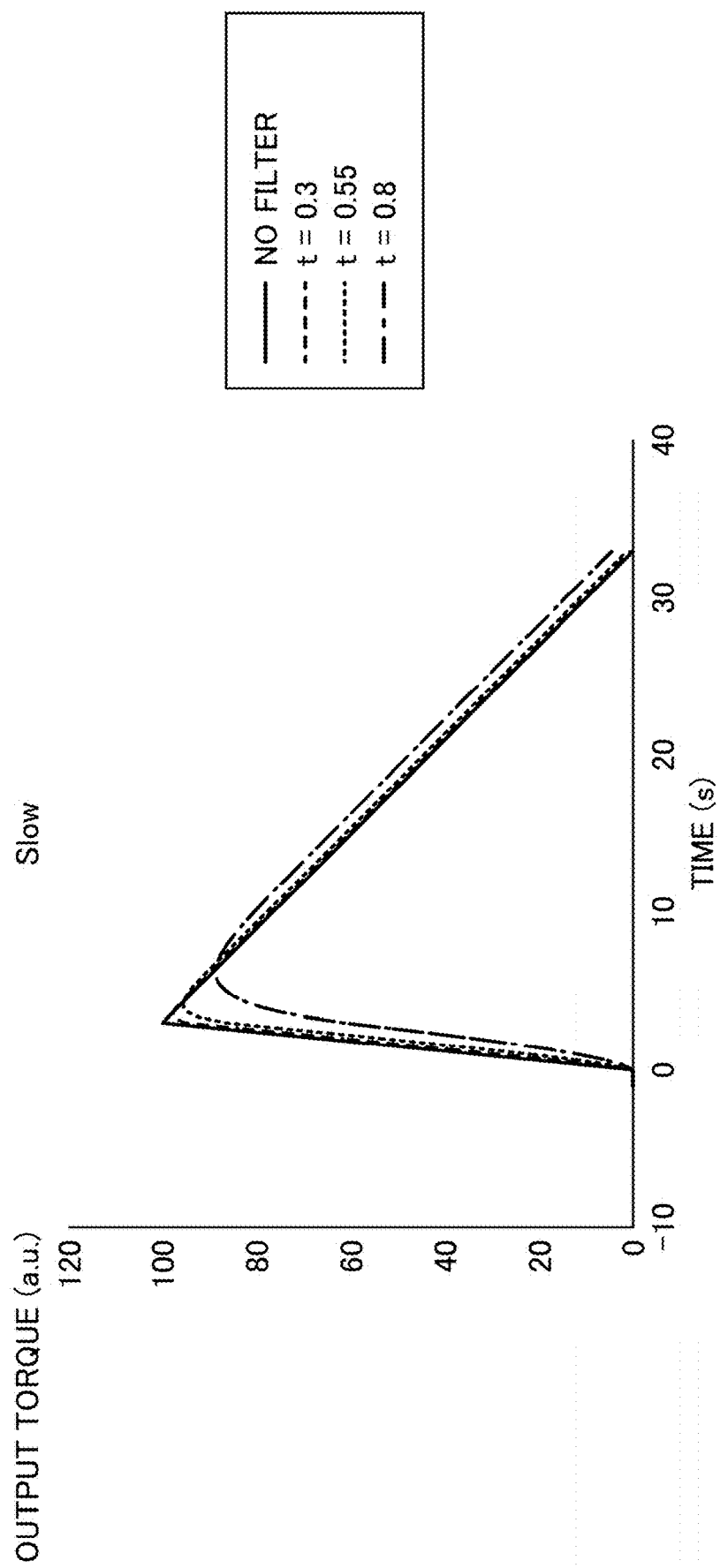

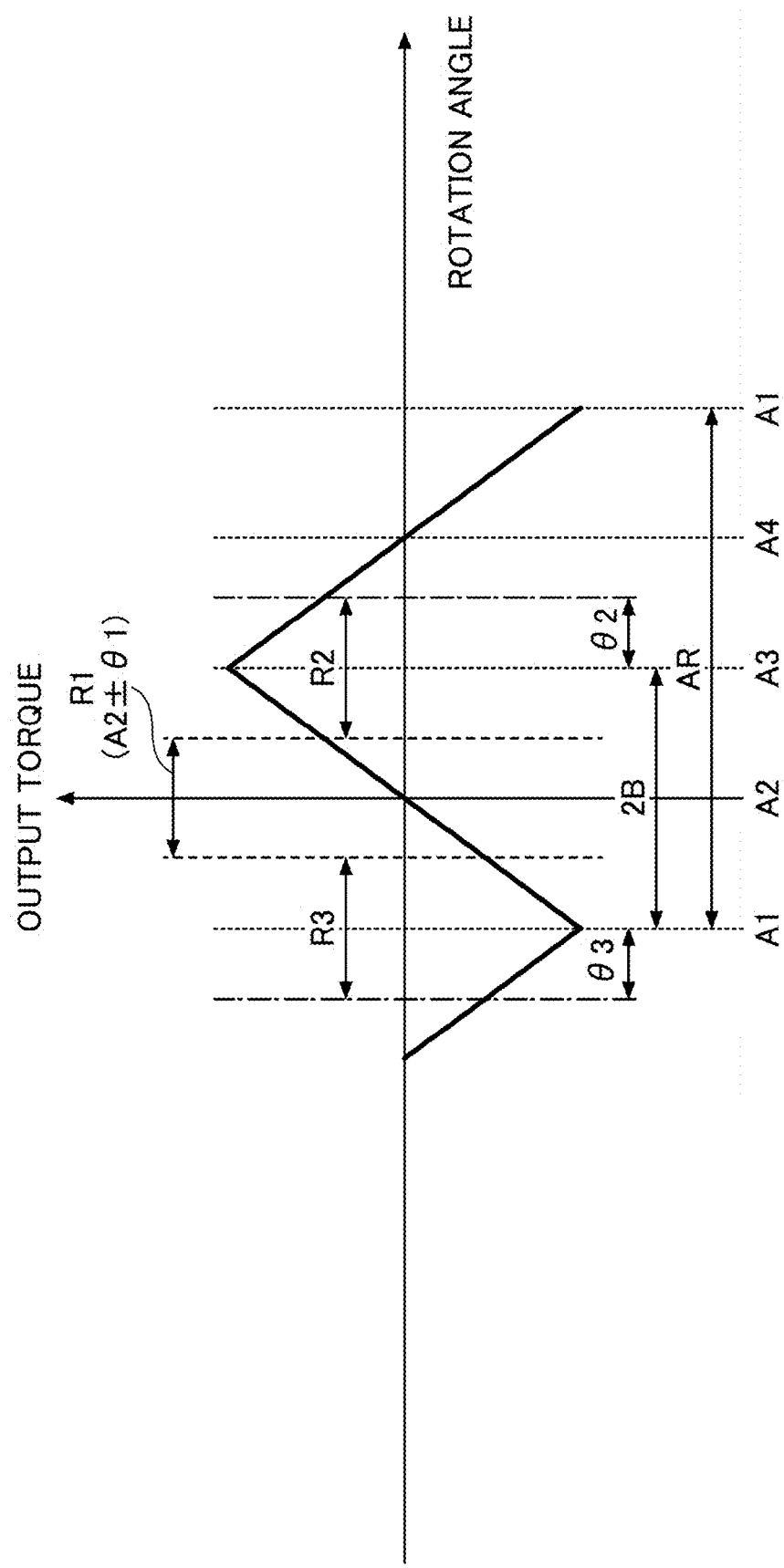

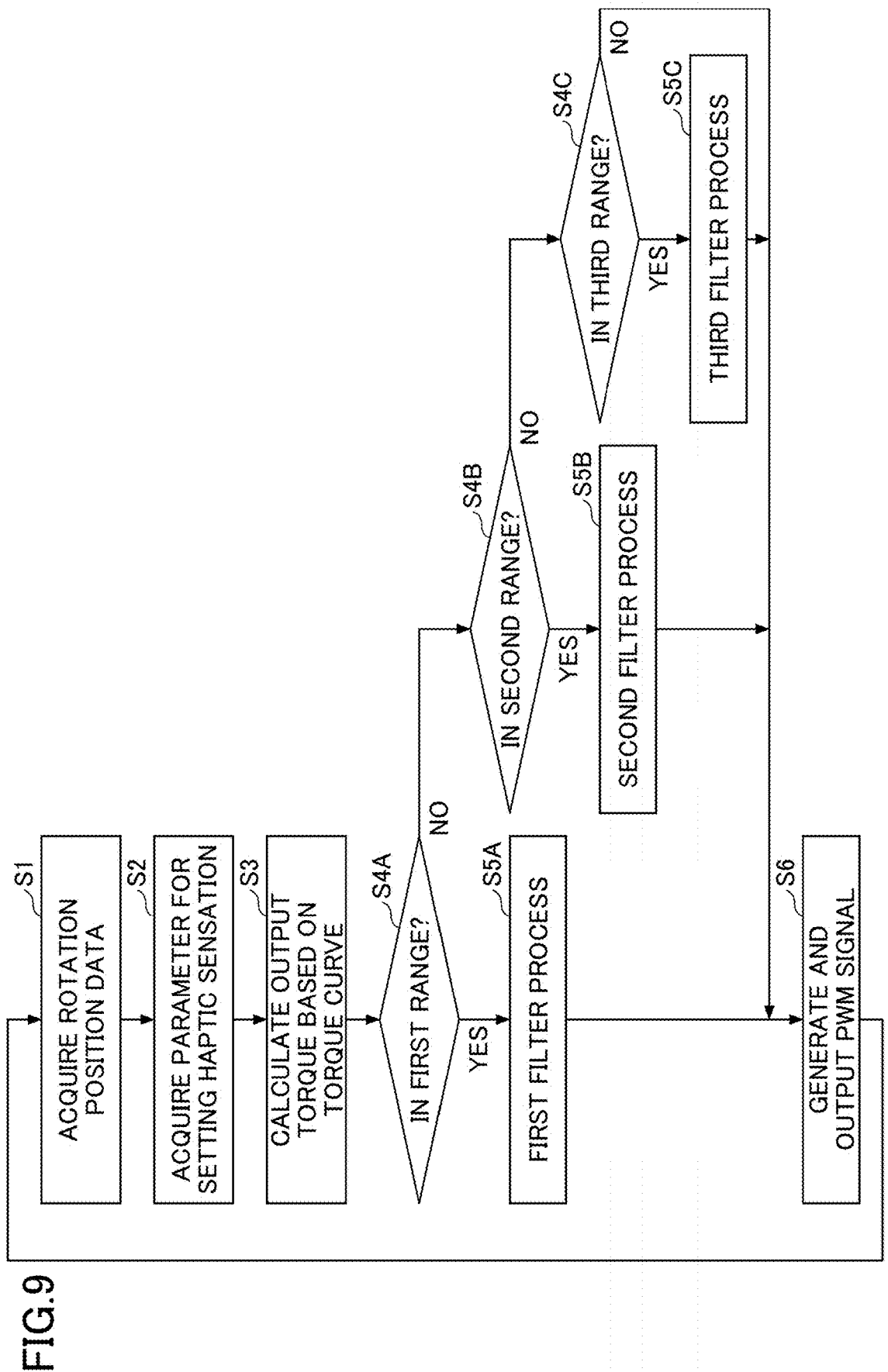

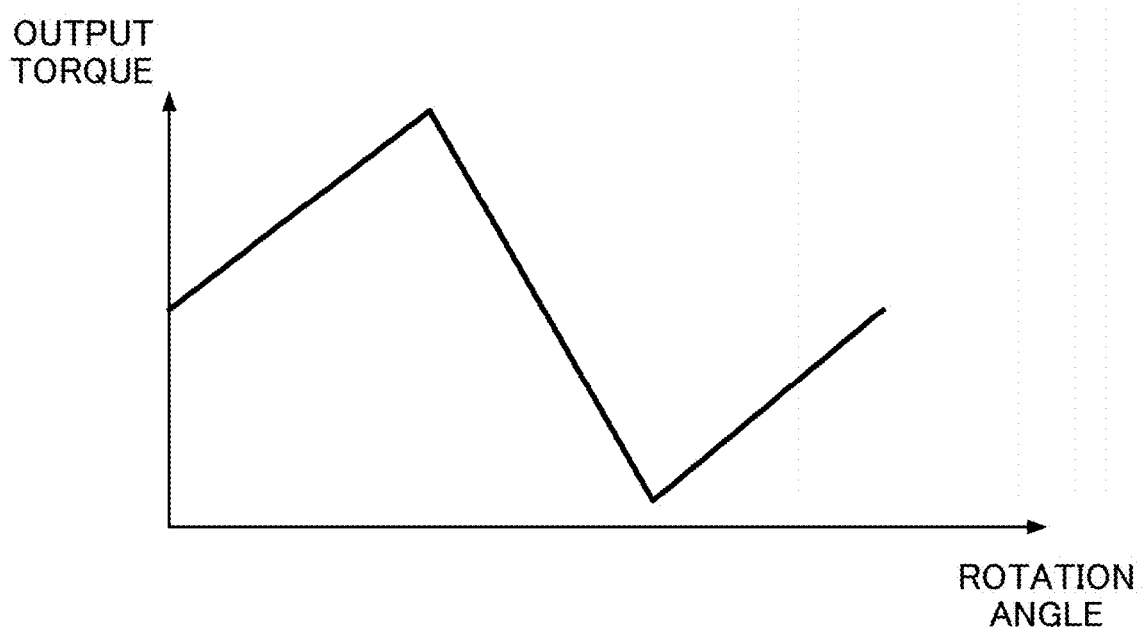

HAPTIC DEVICE AND HAPTIC METHOD

CROSS-REFERENCE TO RELATED APPLICATIONS

This application is a continuation application of International Application No. PCT/JP2023/030634, filed on Aug. 25, 2023, and designating the U.S., which is based upon and claims priority to Japanese Patent Application No. 2022-165386, filed on Oct. 14, 2022, the entire contents of which are incorporated herein by reference.

BACKGROUND

Technical Field

This disclosure relates to a haptic device and a haptic method.

Background Art

Conventionally, there has been a rotational operation device including: an operation member that can rotate in response to receiving an operation of an operator; a rotation angle sensor for detecting the rotation angle of the operation member; a torque applying part for applying an application torque to the operation member along the rotation direction of the operation member; a frictional force applying part for applying a frictional force to the operation member; and a frictional torque control part for changing the application torque and the frictional force in accordance with the rotation angle. In order to inhibit vibrations around a stable point caused by the torque application of the torque applying part, a frictional torque by a magnetorheological fluid or the like is applied (see, for example, International Publication No. WO 2018/135371).

SUMMARY

An existing rotational operation device as a haptic device, which needs a frictional force applying part and a frictional torque control part in order to inhibit vibrations at and around a stable point, does not have a simple configuration.

To provide a haptic device and a haptic method capable of providing a good click feeling while reducing vibrations at and around a stable point with a simple configuration.

A haptic device according to an embodiment of the present disclosure includes:
  an operation part capable of being operated to rotate;
  a detection part configured to detect a rotation position of the operation part;
  a biasing part configured to bias the operation part along a rotation direction of the operation part based on a drive signal that is input into the biasing part;
  a signal generation part configured to generate the drive signal for driving the biasing part based on the rotation position; and
  a low-pass filter part configured to output the drive signal generated by the signal generation part to the biasing part by attenuating a high-frequency component of the drive signal,
  wherein when the rotation position is located between a first position and a second position that is on one side of the first position in the rotation direction, the signal generation part generates the drive signal for causing the biasing part to perform biasing to the other side in the rotation direction,
  wherein when the rotation position is located between the first position and a third position that is on the other side of the first position, the signal generation part generates the drive signal for causing the biasing part to perform biasing to the one side, and
  wherein the low-pass filter part attenuates the high-frequency component of the drive signal more strongly when the rotation position is in a first range including the first position and not including the second position and the third position than when the rotation position is in a second range including the second position and outside the first range or when the rotation position is in a third range including the third position and outside the second range.

It is possible to provide a haptic device and a haptic method capable of providing a good click feeling while reducing vibrations at and around a stable point with a simple configuration.

BRIEF DESCRIPTION OF THE DRAWINGS

FIG. 5B is a diagram showing an example of cutoff frequency vs. filter parameter characteristics of a digital filter;

FIG. 7A is a diagram showing an example of the relationship between the rotational speed of a knob and temporal change of an output torque of a motor;

FIG. 7B is a diagram showing an example of the relationship between the rotational speed of a knob and temporal change of an output torque of a motor;

FIG. 8 is a diagram showing an example of a first range R1, a second range R2, and a third range R3 of a rotation position;

FIG. 9 is a flowchart showing an example of a process executed by an MCU;

FIG. 10C shows an example of a variation of angular characteristics of an output torque.

DETAILED DESCRIPTION OF THE INVENTION

Hereinafter, embodiments to which a haptic device and a haptic method according to the present disclosure are applied will be described.

Embodiments

Figure 1:
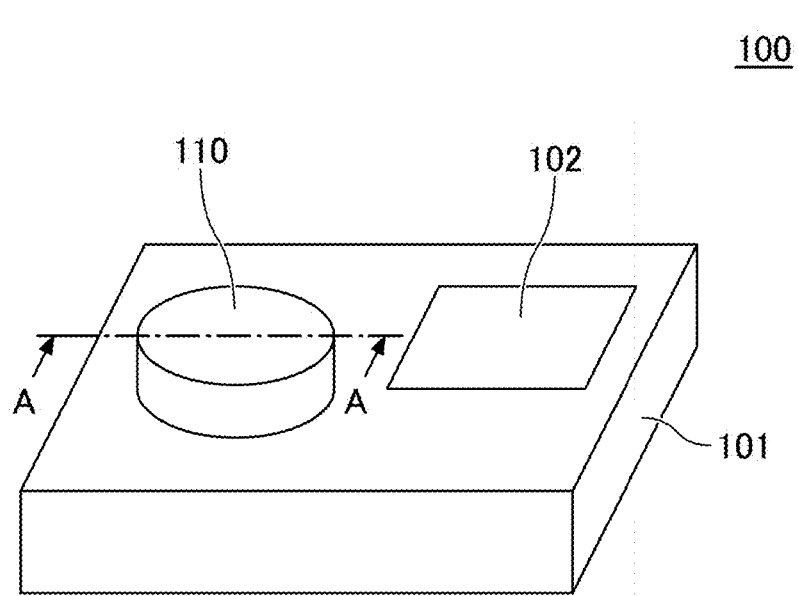
FIG. 1 is an oblique view showing an example of the configuration of a haptic device according to an embodiment.

FIG. 1 is an oblique view showing an example of the configuration of a haptic device 100 according to the present embodiment. The haptic device 100 includes a housing 101, a knob 110 rotatably supported by the housing 101, and a display/input device 102 attached to the housing 101. The knob 110 is an example of an operation part that can be operated by an operator to rotate. The haptic device 100 generates an output corresponding to the rotation of the knob 110, such as the rotation position, the rotational speed, and the like. For example, when the haptic device 100 is used as an input device of an audio device (not shown), for example, the sound volume changes in accordance with the rotation position of the knob 110. For example, when the haptic device 100 is used as an operation device of a transmission system of a vehicle (not shown), for example, the gear position of the transmission system changes in accordance with the rotation position. The haptic device 100 is not limited to such applications, but can be used as an operation device of a game console or other electronic devices.

Although an embodiment in which the knob 110 is rotatable will be described here, the knob 110 may be an operation part that is slid between one side and the other side in one direction, such as a slider.

The display/input device 102 is a touch panel display that displays various information to the operator and receives inputs from the operator. In another example, the display/input device 102 may be caused to display information and receive inputs in response to a mechanical member, such as a dial, a slider, a switch, or the like, being operated. The display/input device 102 may provide information and receive inputs by another principle, such as sound. Although the haptic device 100 is shown to include the display/input device 102 in FIG. 1, it does not need to include the display/input device 102.

Figure 2:
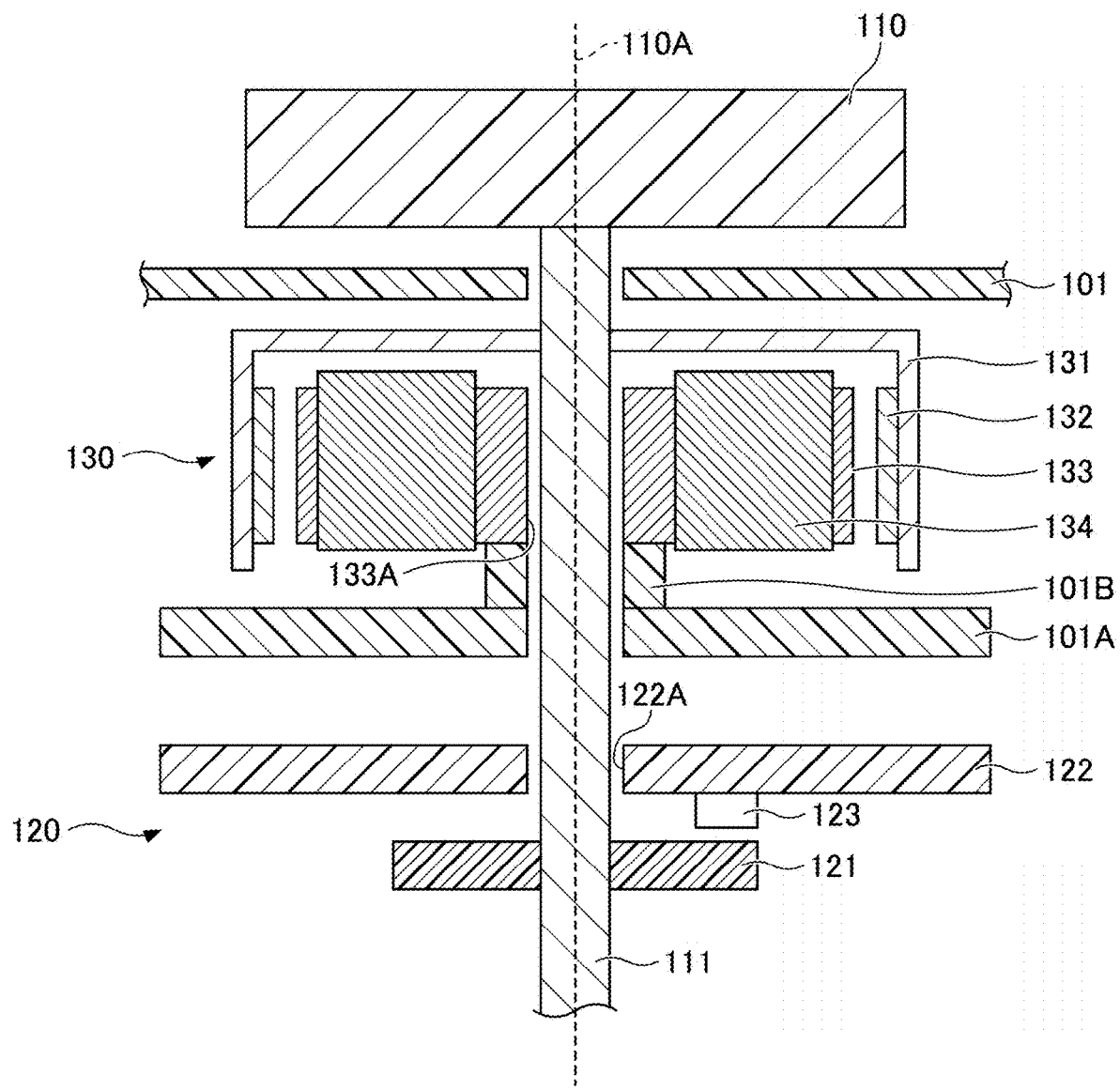
FIG. 2 is a partial cross-sectional view of the haptic device in a cross-section taken along a line A-A of FIG. 1 as seen in the arrow direction.

FIG. 2 is a partial cross-sectional view of the haptic device 100 in a cross-section taken along a line A-A of FIG. 1 as seen in the arrow direction. The cross-sectional view of FIG. 2 passes through a rotation axis 110A of the knob 110. In addition to the housing 101, the display/input device 102 (see FIG. 1), and the knob 110, the haptic device 100 includes a rotation shaft 111, a rotation position sensor 120, and a motor 130, as shown in FIG. 2. The rotation position sensor 120 is an example of a detection part. The motor 130 is an example of a biasing part.

As shown in FIG. 2, the knob 110 is exposed outside the housing 101 shown in FIG. 1, and is connected to the rotation shaft 111 housed in the housing 101. The outer shape of the knob 110 is a substantially cylindrical shape having a central axis extending along the rotation axis 110A. The rotation shaft 111 extends from the knob 110 along the rotation axis 110A. The outer shape of the rotation shaft 111 is a substantially cylindrical shape having a central axis coincident with the rotation axis 110A. The knob 110 and the rotation shaft 111 are integrally rotatable with each other about the rotation axis 110A.

A coding wheel 121 of the rotation position sensor 120 and a rotor housing 131 of the motor 130 are fixed to the rotation shaft 111. The coding wheel 121 and the rotor housing 131 are integrally rotatable with the rotation shaft 111 about the rotation axis 110A.

In the following, for the sake of description, a rotation direction of the rotation shaft 111 to one side when the rotation shaft 111 is viewed from the knob 110 (for example, the clockwise rotation direction of the rotation shaft 111 when the rotation shaft 111 is viewed from the knob 110) is referred to as a positive rotation direction. A rotation direction of the rotation shaft 111 to the other side when the rotation shaft 111 is viewed from the knob 110 (for example, the counterclockwise rotation direction of the rotation shaft 111 when the rotation shaft 111 is viewed from the knob 110) is referred to as a negative rotation direction. A rotation of the knob 110 or the rotation shaft 111 in the positive rotation direction may be referred to as a rotation in the positive direction, and a rotation thereof in the negative rotation direction may be referred to as a rotation in the negative direction.

The rotation position sensor 120 includes a disk-shaped coding wheel 121, a circuit board 122, and a sensor part 123. The rotation position sensor 120 is, for example, a rotary encoder. The rotation position sensor 120 detects the rotation position of the rotation shaft 111, that is, the rotation position of the knob 110. The rotation position sensor 120 may be any sensor as long as it can detect the rotation position of the knob 110.

The coding wheel 121 is fixed to the rotation shaft 111, and has a plurality of holes that are formed in the circumferential direction. The circuit board 122 is fixed to the housing 101 by a fixing member or the like (not shown), and the rotation shaft 111 is inserted through a through-hole 122A. The sensor part 123 is provided on the circuit board 122, and includes a light emitting part and a light receiving part.

The rotation position sensor 120 detects the rotation position of the coding wheel 121 by causing the sensor part 123 to optically detect the holes of the coding wheel 121 rotating together with the rotation shaft 111. Since the rotation position is represented by the rotation angle of the coding wheel 121, the rotation position sensor 120 can detect the rotation position of the knob 110. The rotation position sensor 120 is not limited to the optical sensor as described above, but may be a sensor that magnetically detects the rotation position of the rotation shaft 111.

The rotation angle representing the rotation position of the knob 110 detected by the rotation position sensor 120 is, for example, defined to increase in the positive rotation direction of the rotation shaft 111. The rotation angle representing the rotation position of the knob 110 detected by the rotation position sensor 120 is, for example, defined to decrease in the negative rotation direction of the rotation shaft 111.

The motor 130 includes the rotor housing 131, permanent magnets 132, a magnetic core 133, and coils 134. The motor 130 is a three-phase brushless motor, is an outer rotor type, and is a surface magnet type. The motor 130 of this type can rotate smoothly with little cogging.

The rotor housing 131 is a cylindrical housing opened at the bottom, and is fixed in a state of the rotation shaft 111 being inserted into a through-hole in the center of an upper part. A plurality of permanent magnets 132 are fixed on the inner side of the rotor housing 131 along the circumferential direction.

The magnetic core 133 is a stator, and is fixed by a support part 101B provided in the center of the upper surface of a support plate 101A inside the housing 101. The magnetic core 133 has a through-hole 133A in the center, and the rotation shaft 111 is rotatably inserted into the through-hole 133A and into the through-hole of the support part 101B.

The magnetic core 133 is provided with a plurality of coils 134. The plurality of coils 134 are divided into U-phase, V-phase, and W-phase, are supplied with, for example, a Pulse Width Modulation (PWM) current from U-phase, V-phase, and W-phase half-bridge circuits included in a motor driver Integrated Circuit (IC).

When a PWM current is supplied from the motor driver IC to the U-phase, V-phase, and W-phase coils 134, a torque generated by the motor 130 is transmitted to the knob 110 via the rotation shaft 111.

The motor 130 is driven to provide a haptic sensation to the operator's hand gripping the knob 110. For example, every time the knob 110 is rotated by 12 degrees, which is the result of dividing one full rotation (360 degrees) of the knob 110 by 30, the motor 130 generates a torque in the direction opposite to the rotation direction, such that a click feeling can be provided to the operator's hand via the knob 110. By the motor 130 generating a torque in this way, the motor 130 biases the knob 110 along the rotation direction of the knob 110.

Figure 3:
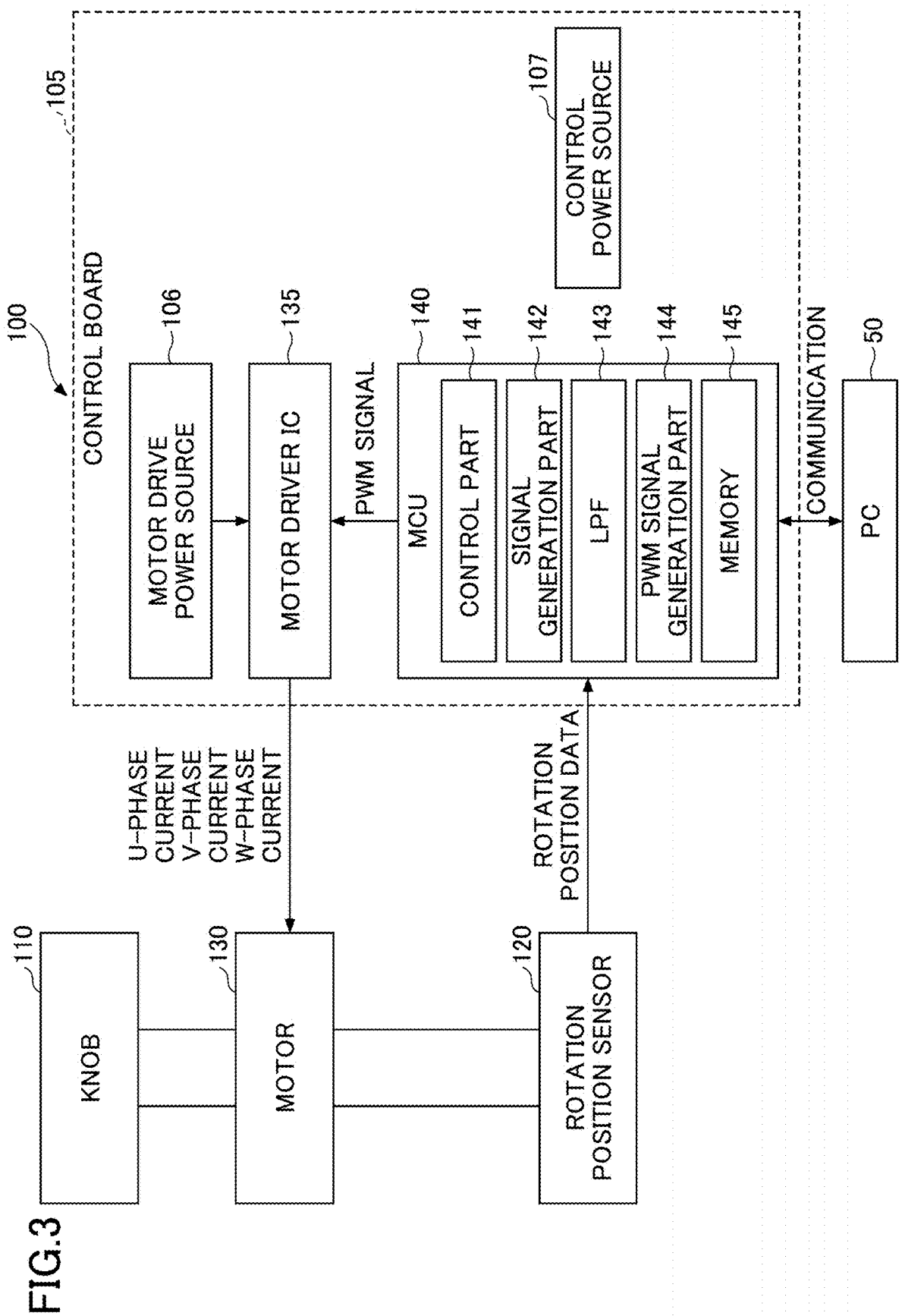
FIG. 3 is a block diagram showing an example of the configuration of the haptic device.

FIG. 3 is a block diagram showing an example of the configuration of the haptic device 100. The haptic device 100 includes a control board 105, a motor drive power source 106, a control power source 107, a motor driver IC 135, and a Micro Controller Unit (MCU) 140. FIG. 3 also shows the knob 110, the rotation position sensor 120, and the motor 130 of the haptic device 100.

FIG. 3 shows a Personal Computer (PC) 50 in addition to the haptic device 100. The PC 50 is an example of an electronic device that communicates with the MCU 140 by wireless communication, wired communication through a cable or the like, and the like, to set a haptic sensation of the haptic device 100. The electronic device that sets a haptic sensation of the haptic device 100 is not limited to the PC 50, and may be various electronic devices, such as a smartphone, a game console, and the like.

The control board 105 is a motherboard on which the motor drive power source 106, the control power source 107, the motor driver IC 135, and the MCU 140 are mounted. The motor drive power source 106 is connected to an external power source and supplies a Direct-Current (DC) power for motor drive to the motor driver IC 135. The control power source 107 supplies a DC power for driving a Metal-Oxide-Semiconductor Field-Effect Transistors (MOSFETs) included in the half-bridge circuits to the motor driver IC 135, and supplies a DC power to the rotation position sensor 120 and the MCU 140.

The motor driver IC 135 includes the half-bridge circuits that are connected to the U-phase, V-phase, and W-phase coils 134. The motor driver IC 135 outputs a U-phase current, a V-phase current, and a W-phase current to the U-phase, V-phase, and W-phase coils 134 of the motor 130 by the MOSFETs of the half-bridge circuits being driven by a PWM signal output from the MCU 140.

The MCU 140 includes a control part 141, a signal generation part 142, a Low-pass filter (LPF) 143, a PWM signal generation part 144, and a memory 145. The LPF 143 is an example of a low-pass filter part. The MCU 140 is implemented by a computer including a Central Processing Unit (CPU), a Random Access Memory (RAM), a Read Only Memory (ROM), an input/output interface, an internal bus, and the like. The control part 141, the signal generation part 142, the LPF 143, and the PWM signal generation part 144 are functional block representations of the functions of a program executed by the MCU 140. The memory 145 functionally represents the memory of the MCU 140.

The control part 141 is a processing part that supervises the control of the MCU 140 and executes processes other than those performed by the signal generation part 142, the LPF 143, and the PWM signal generation part 144. The memory 145 stores programs, data, and the like necessary for the processes executed by the control part 141, the signal generation part 142, the LPF 143, and the PWM signal generation part 144.

The signal generation part 142 generates a drive signal for driving the motor 130 in the positive rotation direction or the negative rotation direction based on the rotation position of the knob 110 detected by the rotation position sensor 120, and outputs the generated drive signal to the LPF 143. The drive signal is calculated based on the rotation position of the knob 110, and is a signal representing a torque (output torque) that is output by the motor 130 to the rotation shaft 111 and the knob 110. The motor 130 is driven based on the drive signal, to thereby bias the rotation shaft 111 and the knob 110 in the positive rotation direction or the negative rotation direction.

The LPF 143 is a digital filter that outputs the drive signal that is input thereto from the signal generation part 142 to the PWM signal generation part 144 by attenuating the high-frequency component of the drive signal. More specifically, the LPF 143 outputs the drive signal that is input thereto from the signal generation part 142 to the PWM signal generation part 144 by attenuating the high-frequency component of the drive signal more strongly when the rotation position of the knob 110 is in a predetermined angle range including a stable point in terms of the drive of the motor 130 than when the rotation position of the knob 110 is outside the predetermined angle range including the stable point in terms of the drive of the motor 130. The reason why the high-frequency component is attenuated more strongly when the rotation position is in the predetermined angle range including the stable point is to inhibit vibrations of the rotation of the knob 110 at, and before and after the stable point.

The PWM signal generation part 144 generates a PWM signal for driving the motor 130 based on the drive signal passed through the LPF 143, and outputs the PWM signal to the motor driver IC 135. As a result, the motor driver IC 135 is driven by the PWM signal, to output a U-phase current, a V-phase current, and a W-phase current to the U-phase, V-phase, and W-phase coils 134 of the motor 130. In this way, the motor 130 is driven based on the drive signal attenuated by the LPF 143.

In this embodiment, a mode in which the PWM signal generation part 144 generates a PWM signal based on the drive signal passed through the LPF 143 is described. However, the order of the LPF 143 and the PWM signal generation part 144 may be opposite. That is, the PWM signal generation part 144 may generate a PWM signal based on the drive signal generated by the signal generation part 142, and the LPF 143 may output the PWM signal generated by the PWM signal generation part 144 to the motor driver IC 135 by attenuating the high-frequency component of the PWM signal. This is equivalent to the high-frequency component of the drive signal generated by the signal generation part 142 being attenuated by the LPF 143, and to the motor 130 being driven based on the drive signal attenuated by the LPF 143.

<Stable Point and the Like>

Figure 4:
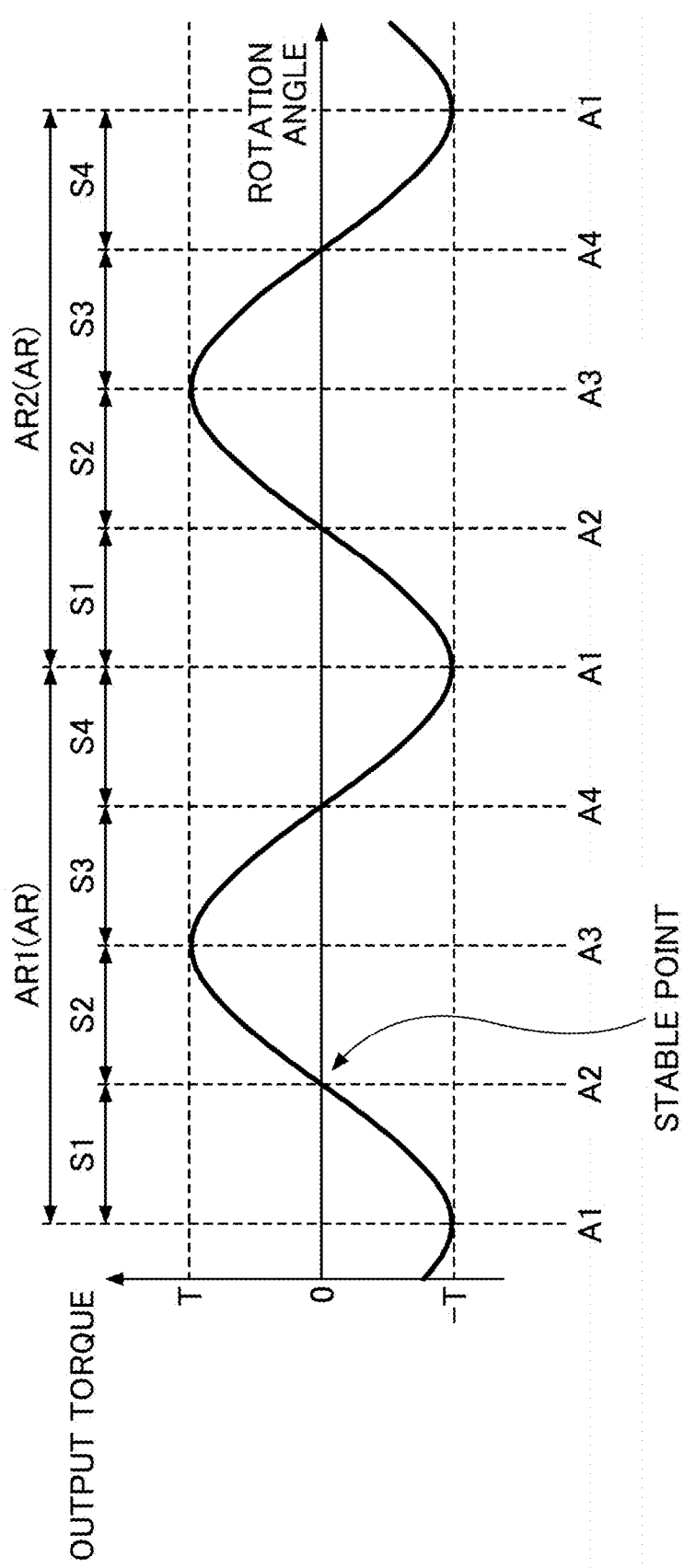
FIG. 4 is a diagram showing an example of the relationship between a rotation position of a knob and an output torque of a motor.

FIG. 4 is a diagram showing an example of the relationship between the rotation position of the knob 110 and the output torque of the motor 130. Since the rotation position of the knob 110 is represented by the rotation angle, the horizontal axis of FIG. 4 represents the rotation angle (degree). The rotation angle is positive to the right-hand side.

An output torque of the motor 130 is a torque that is output by the motor 130 to the rotation shaft 111 and is a torque for driving the knob 110. The output torque of the motor 130 is a torque represented by the drive signal generated by the signal generation part 142, and FIG. 4 shows a value obtained by converting the drive signal (current value) generated by the signal generation part 142 to a torque. A positive output torque is an output torque for rotating the rotation shaft 111 counterclockwise, and a negative output torque is an output torque for rotating the rotation shaft 111 clockwise.

For example, the haptic device 100 is configured such that the motor 130 generates a torque in a direction opposite to the rotation direction every time the knob 110 is rotated by 12 degrees, which is the result of dividing one full rotation (360 degrees) of the knob 110 by 30. FIG. 4 shows two angle ranges AR1 and AR2 out of the thirty angle ranges AR obtained by dividing one full rotation (360 degrees) of the knob 110 by 30. Hereinafter, when not particularly distinguishing between the two angle ranges AR1 and AR2, they are simply referred to as the angle ranges AR. The characteristics of the output torque in each of the thirty angle ranges AR are the same or similar.

For the sake of expediency, the boundary of each angle range AR is shown at a rotation angle at which the output torque of the motor 130 has the negative maximum value (peak value). However, this is non-limiting. The peak values of the output torque are +T. Here, it is assumed that each angle range AR is a range from the rotation angle A1 at which the output torque is -T to a point before the rotation angle A1 of each next angle range AR through the rotation angles A2, A3, and A4. For example, the sizes of the rotation angle ranges A1 to A2, A2 to A3, A3 to A4, and A4 to A1 are all equal, but do not need to be equal.

The output torque in each angle range AR changes sinusoidally from −T at the rotation angle A1 to zero at the rotation angle A2, and increases sinusoidally from the rotation angle A2 to the positive maximum value T at the rotation angle A3. The output torque decreases sinusoidally from the rotation angle A3 to zero at the rotation angle A4, and the absolute value of the output torque increases toward the negative maximum value-T at the rotation angle A1 of the next angle range AR.

Here, the rotation angle A2 is the rotation angle coinciding with the stable point in terms of the drive of the motor 130. The stable point in terms of the drive of the motor 130 is the rotation position at which the torque (output torque) output by the motor 130 to the rotation shaft 111 and the knob 110 and the steady frictional force generated on the rotation shaft 111 and the knob 110 are theoretically balanced. At the stable point, rotating the knob 110 slightly in the positive direction generates an output torque that causes the knob 110 to return in the negative direction, and rotating the knob 110 slightly in the negative direction generates an output torque that causes the knob 110 to return in the positive direction. The stable point in terms of the drive of the motor 130 is an example of a first position among the rotation positions of the knob 110. The stable point in terms of the drive of the motor 130 may also be referred to as the stable point among the rotation positions of the knob 110.

The rotation angle A3, which represents the rotation position at which the absolute value of the output torque of the motor 130 reaches the maximum value (T) in the positive rotation direction of the rotation shaft 111 is an example of a second position. The rotation angle A1, which represents the rotation position at which the absolute value of the output torque of the motor 130 reaches the maximum value (−T) in the negative rotation direction of the rotation shaft 111 is an example of a third position.

Around the angle A2, which is the stable point, rotating the knob 110 in the positive direction generates an output torque that causes the knob 110 to return in the negative direction, and rotating the knob 110 in the negative direction generates an output torque that causes the knob 110 to return in the positive direction, which may cause vibrations in the rotation of the knob 110. At the stable point, the duty ratio of the PWM signal to be generated by the PWM signal generation part 144 is greatly changed, which is also a factor that causes vibrations in the rotation of the knob 110.

Therefore, the haptic device 100 attenuates the high-frequency component of the drive signal input from the signal generation part 142 more strongly when the rotation position of the knob 110 is in the predetermined angle range including the stable point than when the rotation position of the knob 110 is outside the predetermined angle range including the stable point. When the rotation position of the knob 110 is in the predetermined angle range including the stable point, the LPF 143 attenuates the high-frequency component of the drive signal more strongly in order to inhibit vibrations due to the rotation of the knob 110. On the other hand, when the rotation position of the knob 110 is outside the predetermined angle range including the stable point, especially when the rotation position is around the point at which the output torque of the motor 130 peaks, a change in the output torque has a great impact on providing of a haptic sensation, such as a click feeling and the like, to the operator. Therefore, strongly attenuating the high-frequency component of the drive signal when the rotation position of the knob 110 is outside the predetermined angle range including the stable point might weaken the haptic sensation to be presented by the haptic device 100 to the operator. Therefore, when the rotation position is outside the predetermined angle range including the stable point, the attenuation rate of the LPF 143 is set to be low.

<Filter Parameter t of LPF 143>

Figure 5A:
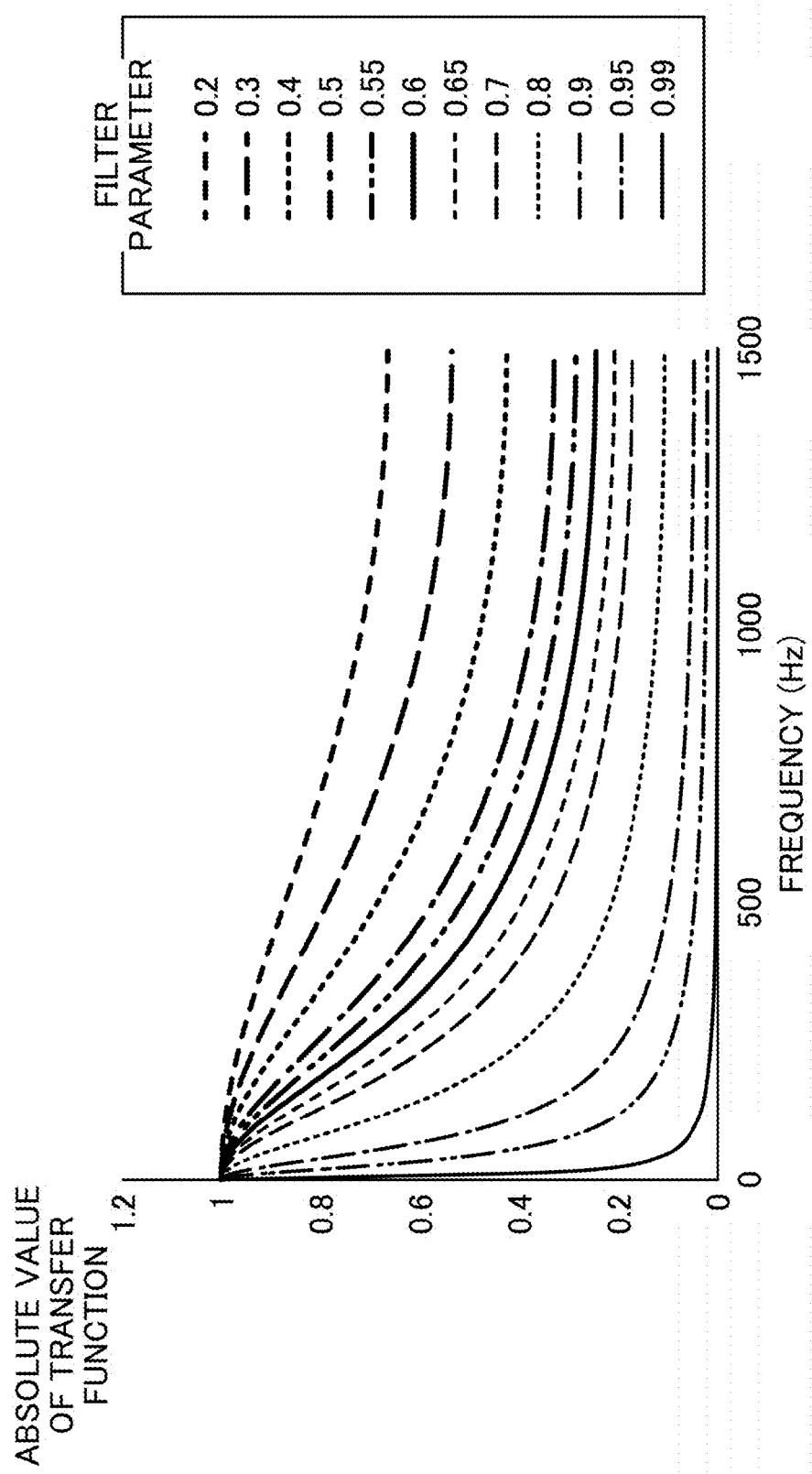
FIG. 5A is a diagram showing an example of frequency domain characteristics of the absolute value of a transfer function for an input signal into a digital filter.

FIG. 5A shows an example of frequency domain characteristics of the absolute value of a transfer function for an input signal into a digital filter. FIG. 5A shows the characteristics at a filter parameter t of 0.2 to 0.99. FIG. 5B shows an example of a cutoff frequency vs. filter parameter t characteristics of a digital filter.

A low-pass filter composed of a digital filter, such as the LPF 143, is represented by a difference equation, such as the following equation (1), where x[n] represents an input and y[n] represents an output. Note that n is a serial number for calculating the input and the output. A low-pass filter represented by the difference equation (1) is an Infinite Impulse Response (IIR) filter. However, the digital filter, of which the LPF 143 is composed, is not limited to an infinite impulse response (IIR) filter, and may be a low-pass filter expressed by a difference equation other than the equation (1).

[Equation 1]

$$y[n] = (1-t) \times x[n] + t \times y[n-1] \qquad (1)$$

That is, the n-th output y[n] of the low-pass filter is represented by the linear sum of the n-th input x[n] and the (n−1)th output y[n]. The coefficients (1−t) and t by which the input x[n] and the output y[n−1] are multiplied are expressed by the filter parameter t. The filter parameter t is a value related to a high-frequency component attenuation rate of a low-pass filter composed of a digital filter. It is possible to set the attenuation rate of the low-pass filter by setting the filter parameter t.

As shown in FIG. 5A, when the filter parameter t is set to 0.2 to 0.99, the frequency domain characteristics of the absolute value of a transfer function for an input signal into a low-pass filter composed of a digital filter change significantly, and the greater the filter parameter t, the smaller the absolute value of the transfer function.

As shown in FIG. 5B, the cutoff frequency decreases as the filter parameter t increases.

In this embodiment, the cutoff frequency of the LPF 143 of the haptic device 100 is set to, for example, 300 Hz or lower when the rotation position of the knob 110 is in the predetermined angle range including the stable point. Minute vibrations at a frequency of 300 Hz or lower are easily perceived by the Pacinian corpuscle present in the surface of a human hand. Setting the cutoff frequency of the LPF 143 to 300 Hz or lower when the rotation position of the knob 110 is in the predetermined angle range including the stable point makes it possible to more effectively reduce the vibrations at and around the stable point. Although the Pacinian corpuscle can perceive minute vibrations of 250 Hz or lower more easily, it can perceive vibrations of up to approximately 300 Hz. Therefore, by setting the cutoff frequency of the LPF 143 to 300 Hz or lower when the rotation position of the knob 110 is in the predetermined angle range including the stable point, it is possible to effectively reduce a haptic sensation that may be provided to the operator via minute vibrations at and around the stable point. Further, it is more preferable to set the cutoff frequency of the LPF 143 of the haptic device 100 to, for example, 250 Hz or lower when the rotation position of the knob 110 is in the predetermined angle range including the stable point, because this makes it possible to further reduce a haptic sensation that may be provided to the operator via minute vibrations.

Figure 6:
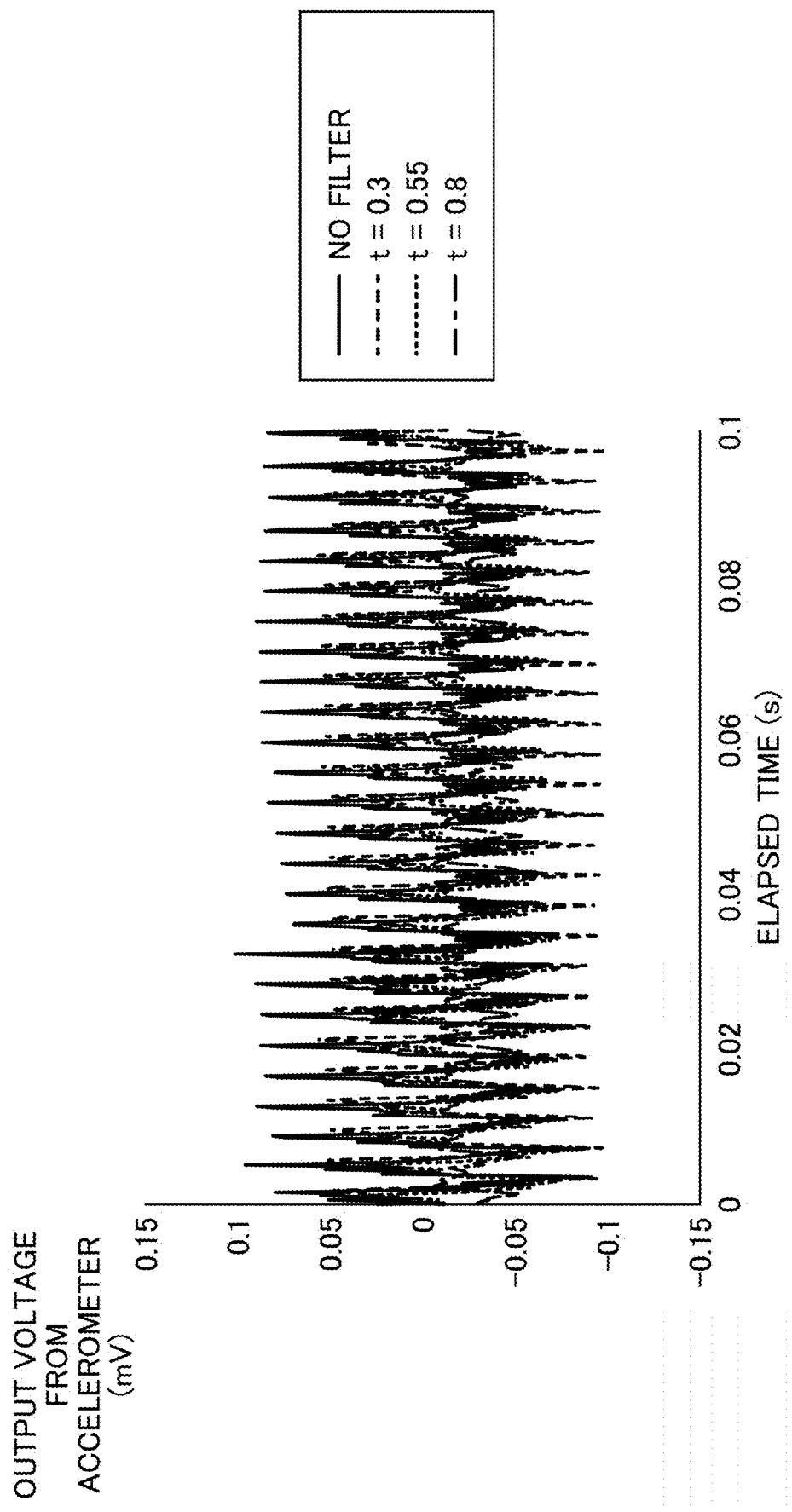
FIG. 6 is a diagram showing an example of the relationship between filter parameter and temporal change of the acceleration of a knob as an output.

FIG. 6 shows an example of the relationship between the filter parameter t and temporal change of the acceleration of the shaft of the knob 110 in the radial direction as an output. FIG. 6 shows an example of the result of experiment for measuring the acceleration of the knob 110 in the radial direction in response to an input of a signal into the low-pass filter composed of a digital filter to cause vibrations in the knob 110 in accordance with an output. In FIG. 6, the horizontal axis represents the elapsed time(s) since the measurement was started, and the vertical axis represents the output voltage (mV) from an accelerometer.

FIG. 6 shows the acceleration of the knob 110 at a filter parameter t of 0.3, 0.55, and 0.8, and the acceleration of the knob 110 without use of the low-pass filter composed of a digital filter (no filter).

As shown in FIG. 6, it was confirmed that the acceleration without the filter was the highest, and that the greater the filter parameter t, the lower the acceleration. Thus, it was confirmed that use of the low-pass filter composed of a digital filter resulted in a small absolute value of the output, and that the greater the filter parameter t, the smaller the absolute value of the output (i.e., the greater the attenuation rate).

FIGS. 7A and 7B show examples of the relationship between the rotational speed of the knob 110 and the temporal changes of the output torque of the motor 130. The characteristics shown in FIGS. 7A and 7B are experimental results.

FIG. 7A shows the temporal changes of the output torque of the motor 130 when the knob 110 was rotated by one angle range AR from the stable point at a rotational speed of one full rotation (360 degrees) per second. Since the example shown in FIG. 7A shows rotations of the knob 110 faster than those in the example shown in FIG. 7B, FIG. 7A shows a legend "Fast" whereas FIG. 7B shows a legend "Slow". FIG. 7A shows the temporal change of the output torque without use of the LPF 143 (no filter) in addition to the temporal changes of the output torque at a filter parameter t of 0.3, 0.55 and 0.8.

FIG. 7B shows the temporal changes of the output torque of the motor 130 when the knob 110 was rotated by one angle range AR from the stable point at a rotational speed of one-third a full rotation (120 degrees) per second. In the example shown in FIG. 7B, the knob 110 was rotated more slowly than in the example shown in FIG. 7A. Therefore, FIG. 7B shows the legend "Slow". FIG. 7B shows the temporal change of the output torque without use of the LPF 143 (no filter) in addition to the temporal changes of the output torque at a filter parameter t of 0.3, 0.55, and 0.8. In FIGS. 7A and 7B, the timing at which rotation of the knob 110 was initiated is set as zero (0).

In both of FIGS. 7A and 7B, the peak of the output torque immediately after the start of rotation in the case of no filter is the highest, and the greater the filter parameter t in the order of 0.8, 0.55, and 0.3, the lower the peak of the output torque. In addition, when the knob 110 was rotated faster, the peak of the output torque at a filter parameter t of 0.8 was approximately 70% the output torque with no filter, and it was found that the waveform attenuated greatly. When the knob 110 was rotated slowly, the peak of the output torque at a filter parameter t of 0.8 was approximately 85% the output torque with no filter, and it was found that the greater the filter parameter t, the greater the attenuation of the waveform.

The haptic device 100 is intended to provide a favorable click feeling while reducing vibrations at and around the stable point with a simple configuration including the LPF 143 in the MCU 140. From this perspective, in order to reduce vibrations at and around the stable point, the haptic device 100 sets the attenuation rate of the LPF 143 to be high when the rotation position of the knob 110 is at and around the stable point in terms of the drive of the motor 130, and sets the attenuation rate of the LPF 143 to be low when the rotation position of the knob 110 is at and around the peak of the output torque. Setting the attenuation rate of the LPF 143 to be low may include setting the attenuation rate to 0, i.e., no attenuation.

<First Range R1, Second Range R2, and Third Range R3>

FIG. 8 is a diagram showing an example of a first range R1, a second range R2, and a third range R3 of the rotation position. The first range R1 is an example of the predetermined angle range including the stable point. FIG. 8 shows one angle range AR out of thirty angle ranges AR, which are the result of dividing one full rotation (360 degrees) of the knob 110 into thirty segments, and the angles A1 to A4. In FIG. 8, for example, the sizes of the rotation angle ranges A1 to A2, A2 to A3, A3 to A4, and A4 to A1 are all equal, but do not need to be equal.

The vertical axis of FIG. 8 represents the output torque, and FIG. 8 shows the angular characteristics of the output torque obtained when the LPF 143 is not used.

In order to reduce vibrations at and around the stable point, a range between angles±θ1 from the angle A2 in the center is set as the first range R1 at and around the angle A2, at which the rotation position of the knob 110 is at the stable point in terms of the drive of the motor 130. That is, the first range R1 is a range (A2+θ1) between the angles ±θ1 from the angle A2 in the center.

When the rotation position of the knob 110 is in the first range R1, the attenuation rate of the LPF 143 is set to be higher than when the rotation position of the knob 110 is in the second range R2 or the third range R3. The first range R1 is an angle range set between the angle A1 at which the negative peak of the output torque of the motor 130 is obtained and the angle A3 at which the positive peak thereof is obtained. When the angle range from the angle A1 to the angle A3 is defined as 2B, θ1≤4B/5 is satisfied.

In this way, vibrations at and around the stable point are reduced by setting the first range R1 centered on the angle A2, which is the stable point, within the range defined between the angle A1 at which the negative peak of the output torque of the motor 130 is obtained and the angle A3 at which the positive peak of the output torque is obtained. The first range R1 is an angle range including the first position and not including the second position and the third position. An example of the first position is the angle A2, which is the stable point. An example of the second position is the angle A3 at which the absolute value of the output torque of the motor 130 reaches the peak in the positive rotation direction of the rotation shaft 111. An example of the third position is the angle A1 at which the absolute value of the output torque of the motor 130 reaches the peak in the negative rotation direction of the rotation shaft 111.

In order to realize a favorable click feeling, the second range R2 including the angle A3 (an example of the second position) at which the absolute value of the output torque of the motor 130 reaches the peak in the positive rotation direction of the rotation shaft 111 and the third range R3 including the angle A1 (an example of the third position) at which the absolute value of the output torque of the motor 130 reaches the peak in the negative rotation direction of the rotation shaft 111 are set. When the rotation position of the knob 110 is in the second range R2 or the third range R3, the haptic device 100 sets the attenuation rate of the LPF 143 to be lower than when the rotation position of the knob 110 is in the first range R1.

The second range R2 is an angle range including the second position and outside the first range. The third range R3 is an angle range including the third position, and outside the first range and outside the second range. In FIG. 8, for example, the second range R2 is an angle range that is on the side larger than an angle A2+θ1 and on the side equal to or smaller than an angle A3+θ2. The third range R3 is an angle range that is on the side equal to or larger than an angle A1-θ3 and on the side smaller than an angle A2-θ1.

The attenuation rate of the LPF 143 may be set to zero (the same state as with no filter), or the attenuation rate of the LPF 143 may be set such that the haptic sensation of the knob 110 will be good for a range within one angle range AR that is not included in the first range R1, the second range R2, and the third range R3. Here, for example, an embodiment in which the attenuation rate of the LPF 143 is set to zero for a range that is not included in the first range R1, the second range R2, and the third range R3 will be described.

Moreover, an interval may be provided between the first range R1 and the second range R2, and the attenuation rate of the LPF 143 may be set to zero in the interval between the first range R1 and the second range R2. Similarly, an interval may be provided between the first range R1 and the third range R3, and the attenuation rate of the LPF 143 may be set to zero in the interval between the first range R1 and the third range R3.

<Flowchart>

FIG. 9 is a flowchart showing an example of processes executed by the MCU 140. For example, when the power source of the haptic device 100 is turned on, the MCU 140 repeatedly executes the processes from steps S1 to S6 at a predetermined control cycle. For example, the MCU 140 terminates the series of processes when the power source of the haptic device 100 is turned off.

The control part 141 acquires rotation position data from the rotation position sensor 120 (step S1).

The control part 141 acquires a parameter for setting the haptic sensation of the haptic device 100 from the PC 50 (step S2). The parameter for setting the haptic sensation is, for example, the shape of the angular characteristics of the output torque, the absolute value of the peak of the output torque, the divisor by which one full rotation (360 degrees) of the knob 110 is divided, or the like. The shape of the angular characteristics of the output torque is, for example, the angular characteristics of the output torque with respect to the rotation angle as shown in FIG. 4 or FIG. 8. For example, data representing the angular characteristics of the output torque may be stored in the memory 145 such that desired angular characteristics of the output torque can be selected via the PC 50. The absolute value of the peak of the output torque is, for example, the absolute value of the positive peak and the negative peak in the angular characteristics of the output torque with respect to the rotation angle as shown in FIG. 4 or FIG. 8. Although an embodiment in which one full rotation (360 degrees) of the knob 110 is divided into thirty segments has been described, the divisor needs only to be 2 or greater. The process of step S2 may be performed only once in the first control cycle and may be skipped in the second control cycle. Moreover, when the parameter for setting the haptic sensation is set in advance, the process of step S2 may be skipped as well.

The signal generation part 142 calculates the output torque of the motor 130 based on the rotation position data acquired in step S1 and data determined by the parameter for setting the haptic sensation acquired in step S2 (the shape of the angular characteristics of the output torque, the absolute value of the peak of the output torque, the divisor by which one full rotation is divided, or the like) (step S3).

The LPF 143 determines whether or not the rotation angle represented by the rotation position data acquired in step S1 is in the first range R1 (step S4A).

When determining that the rotation angle is in the first range R1 (S4A: YES), the LPF 143 performs a first filter process (step S5A). The first filter process is a process of setting the attenuation rate of the LPF 143 to be higher when the rotation position of the knob 110 is in the first range R1 than when the rotation position of the knob 110 is in the second range R2 or in the third range R3. As a result of step S5A, the drive signal attenuated by the attenuation rate of the LPF 143 set in the first filter process is input into the PWM signal generation part 144. When the process of step S5A is completed, the flow proceeds to step S6.

When determining in step S4A that the rotation angle is not in the first range R1 (S4A: NO), the LPF 143 determines whether or not the rotation angle represented by the rotation position data acquired in step S1 is in the second range R2 (step S4B).

When determining that the rotation angle is in the second range R2 (S4B: YES), the LPF 143 performs a second filter process (step S5B). The second filter process is a process of setting the attenuation rate of the LPF 143 to be lower when the rotation position of the knob 110 is in the second range R2 than when the rotation position of the knob 110 is in the first range R1. As a result of step S5B, the drive signal attenuated by the attenuation rate of the LPF 143 set in the second filter process is input into the PWM signal generation part 144. When the process of step S5B is completed, the flow proceeds to step S6.

When determining in step S4B that the rotation angle is not in the second range R2 (S4B: NO), the LPF 143 determines whether or not the rotation angle represented by the rotation position data acquired in step S1 is in the third range R3 (step S4C).

When determining that the rotation angle is in the third range R3 (S4C: YES), the LPF 143 performs a third filter process (step S5C). The third filter process is a process of setting the attenuation rate of the LPF 143 to be lower when the rotation position of the knob 110 is in the third range R3 than when the rotation position of the knob 110 is in the first range R1. As a result of step S5C, the drive signal attenuated by the attenuation rate of the LPF 143 set in the third filter process is input into the PWM signal generation part 144. When the process of step S5C is completed, the flow proceeds to step S6. The attenuation rate set by the LPF 143 in the third filter process may be the same as or different from the attenuation rate set by the LPF 143 in the second filter process.

When determining in step S4C that the rotation angle is not in the third range R3 (S4C: NO), the LPF 143 outputs the drive signal without performing any filter process. When the LPF 143 determines NO in step S4C, the LPF 143 outputs the drive signal as is to the PWM signal generation part 144 without performing any filter process. The flow proceeds to step S6.

The PWM signal generation part 144 generates a PWM signal based on the input drive signal and outputs the PWM signal to the motor driver IC 135 (step S6). As a result, the motor driver IC 135 outputs a U-phase current, a V-phase current, and a W-phase current to the U-phase, V-phase, and W-phase coils 134 of the motor 130. Thus, the motor 130 is driven based on the drive signal attenuated by the LPF 143.

<Effect>

The haptic device 100 of the present embodiment includes: the knob 110 capable of being operated to rotate; the rotation position sensor 120 configured to detect the rotation position of the knob 110; the motor 130 capable of biasing the knob 110 along the rotation direction of the knob 110; the signal generation part 142 configured to generate the drive signal for driving the motor 130 based on the rotation position; and the LPF 143 configured to attenuate the high frequency component of the drive signal, wherein the motor 130 is driven based on the drive signal attenuated by the LPF 143, wherein when the rotation position is located between the stable point (an example of the first position) and the second position that is on the positive rotation direction side (an example of one side in the rotation direction) of the stable point, the signal generation part 142 generates the drive signal for causing the motor 130 to perform biasing to the negative rotation direction side (an example of the other side in the rotation direction), wherein when the rotation position is located between the stable point and the third position that is on the other side of the stable point in the rotation direction, the signal generation part 142 generates the drive signal for causing the motor 130 to perform biasing to the one side, and wherein the LPF 143 attenuates the high-frequency component of the drive signal more strongly when the rotation position is in the first range including the stable point and not including the second position and the third position than when the rotation position is in the second range including the second position and outside the first range, or when the rotation position is in the third range including the third position and outside the first range and outside the second range.

Therefore, the high-frequency component of the drive signal can be strongly attenuated by the LPF 143 when the rotation position is in the first range R1 including the stable point and the surrounding region of the stable point, and the attenuation rate of the LPF 143 can be reduced when the rotation position is in the second range R2 or the third range R3.

Therefore, it is possible to provide the haptic device 100 that, with a simple configuration including the LPF 143 in the MCU 140, is capable of providing a favorable click feeling while reducing vibrations at and around the stable point.

A haptic method of the present embodiment is a haptic method for the haptic device 100 including: the knob 110 capable of being operated to rotate; the rotation position sensor 120 configured to detect the rotation position of the knob 110; the motor 130 capable of biasing the knob 110 along the rotation direction of the knob 110; the signal generation part 142 configured to generate the drive signal for driving the motor 130 based on the rotation position; and the LPF 143 configured to attenuate the high-frequency component of the drive signal, wherein the motor 130 is driven based on the drive signal attenuated by the LPF 143, the haptic method including: when the rotation position is located between the stable point and the second position that is on one side of the stable point in the rotation direction, causing the signal generation part 142 to generate the drive signal for causing the motor 130 to perform biasing to the other side in the rotation direction; when the rotation position is located between the stable point and the third position that is on the other side of the stable point in the rotation direction, causing the signal generation part 142 to generate the drive signal for causing the motor 130 to perform biasing to the one side; and causing the LPF 143 to attenuate the high-frequency component of the drive signal more strongly when the rotation position is in the first range R1 including the stable point and not including the second position and the third position than when the rotation position is in the second range R2 including the second position and outside the first range R1, or when the rotation position is in the third range R3 including the third position and outside the first range R1 and outside the second range R2.

Therefore, the high-frequency component of the drive signal can be strongly attenuated by the LPF 143 when the rotation position is in the first range R1 including the stable point and the surrounding region of the stable point, and the attenuation rate of the LPF 143 can be reduced when the rotation position is in the second range R2 or the third range R3.

Therefore, it is possible to provide a haptic method for the haptic device 100 that, with a simple configuration including the LPF 143 in the MCU 140, is capable of providing a favorable click feeling while reducing vibrations at and around the stable point.

The signal generation part 142 generates the drive signal such that the force of biasing to the negative rotation direction side (an example of the other side in the rotation direction) peaks at the angle A3 (an example of the second position). Therefore, it is possible to provide the haptic device 100 that, with a simple configuration including the LPF 143 in the MCU 140, is capable of presenting a favorable click feeling by reducing the attenuation rate of the LPF 143 at the position at which the output torque of the motor 130 is maximized.

The cutoff frequency of the LPF 143 may be 300 Hz or lower when the rotation position is in the first range R1. Minute vibrations at a frequency of 300 Hz or lower have a frequency easily perceived by the Pacinian corpuscle in the surface of a human hand. By setting the cutoff frequency of the LPF 143 to 300 Hz or lower in the first range R1 including the stable point, it is possible to more effectively reduce vibrations at and around the stable point with a simple configuration including the LPF 143 in the MCU 140. Although the Pacinian corpuscle can perceive minute vibrations of 250 Hz or lower more easily, it can perceive vibrations of up to approximately 300 Hz. Therefore, by setting the cutoff frequency of the LPF 143 to 300 Hz or lower when the rotation position is in the first range R1, it is possible to more effectively reduce a haptic sensation that may be provided to the operator via minute vibrations at and around the stable point.

The first range R1 may be changed based on the rotational speed of the knob 110. As shown in FIGS. 7A and 7B, the waveform representing the angular characteristics of the output torque attenuates more greatly when the rotational speed of the knob 110 is higher. Therefore, it is possible to provide the haptic device 100 that, with a simple configuration including the LPF 143 in the MCU 140, is capable of providing a favorable click feeling while reducing vibrations at and around the stable point by the LPF 143 changing the first range R1 based on the rotational speed of the knob 110.

The first range R1 may be set such that the higher the rotational speed of the knob 110, the narrower angle range it becomes. When the rotational speed is high, the LPF 143 may act strongly on the second position or the third position due to the time difference between when the drive signal is output and when the motor 130 becomes driven, which might weaken the click feeling. Therefore, by narrowing the first range R1 and switching the filter quickly, it is possible to reduce vibrations in the first range R1. Further, as shown in FIGS. 7A and 7B, the waveform representing the angular characteristics of the output torque attenuates more greatly when the rotational speed of the knob 110 is higher. Therefore, by setting a narrower angle range at a higher rotational speed of the knob 110, it is possible to improve the haptic sensation at the second position and third position at which the output torque peaks.

The LPF 143 may set the cutoff frequency to be lower when the rotation position is in the first range R1 than when the rotation position is in the second range R2 or the third range R3. By setting the cutoff frequency of the LPF 143 to be lower in the first range R1, it is possible to more effectively remove minute vibrations due to the high-frequency component, and to provide a clearer haptic sensation at and around the stable point.

The LPF 143 may set the attenuation rate at equal to or higher than the cutoff frequency to be higher when the rotation position is in the first range R1 than when the rotation position is in the second range R2 or the third range R3. By setting the attenuation rate of the LPF 143 at equal to or higher than the cutoff frequency to be higher in the first range R1, it is possible to more effectively remove minute vibrations due to the high-frequency component, and to provide a clearer haptic sensation at and around the stable point.

Furthermore, the LPF 143 may output the drive signal generated by the signal generation part 142 to the motor 130 by attenuating the high-frequency component of the drive signal only when the rotation position is in the first range R1. This makes it possible to more effectively remove minute vibrations due to the high-frequency component when the rotation position is in the first range R1, and at the same time to avoid occurrence of attenuation of the angular characteristics of the output torque when the rotation position is outside the first range R1. Therefore, it is possible to provide the haptic device 100 that is capable of providing a favorable click feeling while reducing vibrations at and around the stable point, with a simple configuration including the LPF 143 in the MCU 140 and with a simpler process of the LPF 143.

Further, because the motor 130 includes a brushless motor, it is possible to provide the haptic device 100 that is capable of realizing smooth rotations of the knob 110, and is also capable of providing a favorable click feeling while reducing vibrations at and around the stable point, with a simple configuration including the LPF 143 in the MCU 140.

Alternatively, the knob 110 may be an operation part that is not rotated, and is slid between one side and the other side in one direction like a slider. That is, the haptic device 100 includes the knob 110 capable of being operated to travel along one direction, a travel position sensor configured to detect the travel position of the knob 110, the biasing part capable of biasing the knob 110 along the one direction, the signal generation part 142 configured to generate the drive signal for the biasing part based on the travel position, and the LPF 143 configured to attenuate the high-frequency component of the drive signal, wherein the biasing part is driven based on the drive signal attenuated by the LPF 143, wherein when the travel position of the knob 110 is located between the stable point and the second position that is on one side of the stable point in the one direction, the signal generation part 142 generates the drive signal for causing the biasing part to perform biasing to the other side in the one direction, wherein when the travel position of the knob 110 is located between the stable point and the third position that is on the other side of the stable point, the signal generation part 142 generates the drive signal for causing the biasing part to perform biasing to the one side in the one direction, and wherein the LPF 143 may strongly attenuate the high-frequency component of the drive signal when the travel position is in the first range R1 including the stable point and not including the second position and the third position than when the travel position is in the second range R2 including the second position and outside the first range R1, or when the travel position is in the third range R3 including the third position and outside the first range R1 and outside the second range R2.

Therefore, the high-frequency component of the drive signal can be strongly attenuated by the LPF 143 when the position of the knob 110 capable of being operated to travel along one direction is in the first range R1 including the stable point and the surrounding region of the stable point, and the attenuation rate of the LPF 143 can be reduced when the travel position is in the second range R2 or the third range R3.

Therefore, it is possible to provide the haptic device 100 that, with a simple configuration including the LPF 143 in the MCU 140, is capable of providing a favorable click feeling while reducing vibrations at and around the stable point.

<Variations of Angular Characteristics of Output Torque>

Figure 10A:
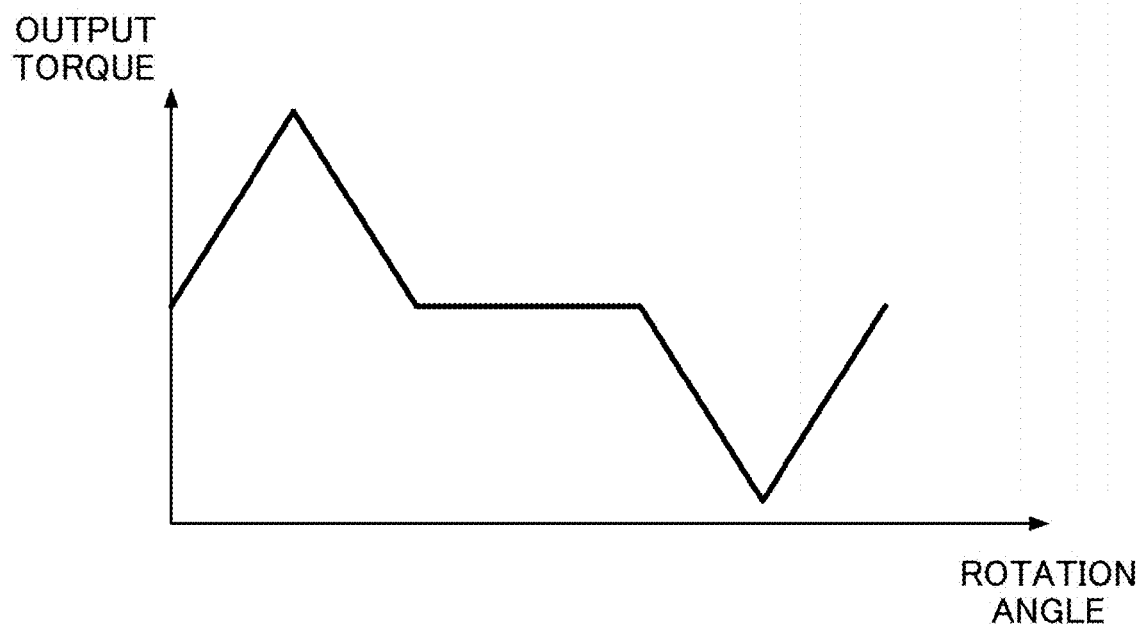
FIG. 10A is a diagram showing an example of a variation of angular characteristics of an output torque.
Figure 10B:
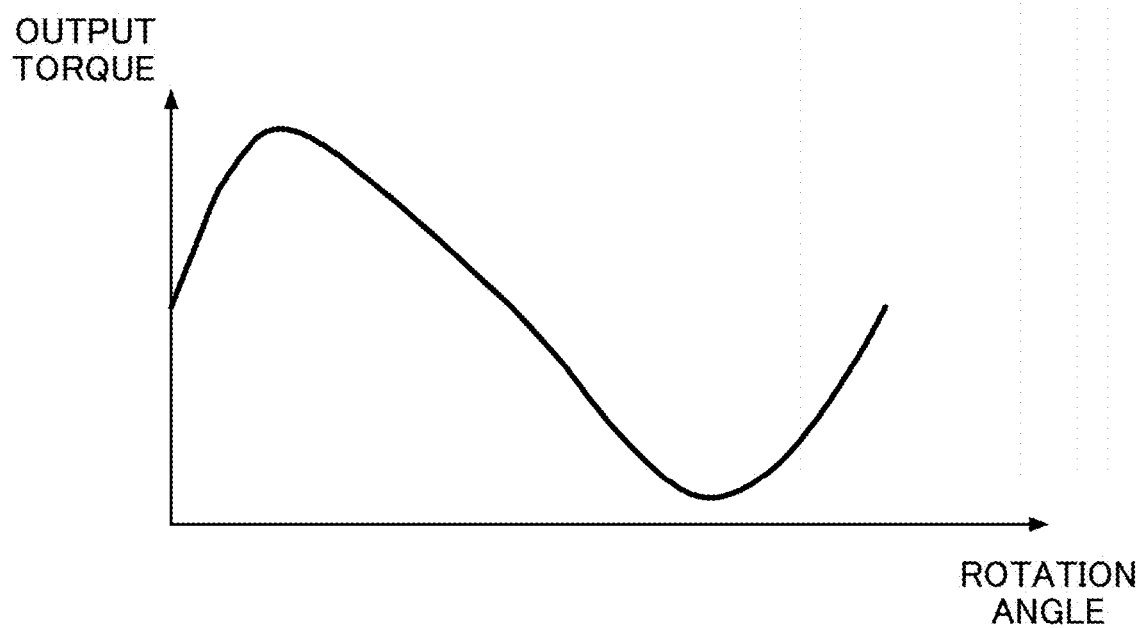
FIG. 10B shows an example of a variation of angular characteristics of an output torque.

FIGS. 10A to 10C show examples of variations of the angular characteristics of the output torque. FIGS. 10A to 10C show the angular characteristics for one rotation angle range AR, with the zero rotation angle point (i.e., the intersection with the axis representing the output torque) being the stable point.

For example, as shown in FIG. 10A, the angular characteristics of the output torque may include a section in which the output torque becomes constant with respect to the rotation angle change. For example, such section in which the output torque becomes constant with respect to the rotation angle change as shown in FIG. 10A may be provided at, and before and after the angle A4 of FIG. 8.

Further, for example, as shown in FIG. 10B, the angular characteristics of the output torque may be characteristics in which the output torque change at the positive peak and the negative peak is curvilinearly smooth, and the absolute value of the rate at which the output torque increases with respect to the increase in the rotation angle is different from the absolute value of the rate at which the output torque decreases with respect to the increase in the rotation angle. For example, when the rotation angle range from the angle A3 to the angle A1 is longer than the rotation angle range from the angle A1 to the angle A3 in FIG. 4 in the direction of the horizontal axis representing the rotation angle, a waveform as shown in FIG. 10B is obtained.

Further, for example, as shown in FIG. 10C, the angular characteristics of the output torque may be characteristics in which the output torque change at the positive peak and the negative peak is sharp like a polyline, and the absolute value of the rate at which the output torque increases with respect to the increase in the rotation angle is different from the absolute value of the rate at which the output torque decreases with respect to the increase in the rotation angle. For example, when the rotation angle range from the angle A1 to the angle A3 is longer than the rotation angle range from the angle A3 to the angle A1 in FIG. 8 in the direction of the horizontal axis representing the rotation angle, a waveform as shown in FIG. 10C is obtained.

The haptic device and the haptic method according to the exemplary embodiments of the present disclosure have been described above. However, the present disclosure is not limited to the specifically disclosed embodiments, and various modifications and changes are applicable without departing from the scope of the claims.

What is claimed is:

1. A haptic device, comprising:
an operation part capable of being operated to rotate;
a detection part configured to detect a rotation position of the operation part;
a biasing part capable of biasing the operation part along a rotation direction of the operation part;
a signal generation part configured to generate a drive signal for driving the biasing part based on the rotation position; and
a low-pass filter part configured to output the drive signal to the biasing part by attenuating a high-frequency component of the drive signal,
wherein when the rotation position is located between a first position and a second position that is on one side of the first position in the rotation direction, the signal generation part generates the drive signal for causing the biasing part to perform biasing to the other side in the rotation direction,
wherein when the rotation position is located between the first position and a third position that is on the other side of the first position in the rotation direction, the signal generation part generates the drive signal for causing the biasing part to perform biasing to the one side, and
wherein the low-pass filter part attenuates the high-frequency component of the drive signal more strongly when the rotation position is in a first range including the first position and not including the second position and the third position than when the rotation position is in a second range including the second position and outside the first range or when the rotation position is in a third range including the third position and outside the first range and outside the second range.

2. The haptic device according to claim 1,
wherein the signal generation part generates the drive signal such that a force of biasing to the other side peaks at the second position.

3. The haptic device according to claim 1,
wherein a cutoff frequency of the low-pass filter part is 300 Hz or lower when the rotation position is in the first range.

4. The haptic device according to claim 1,
wherein the first range is changed based on a rotational speed of the operation part.

5. The haptic device according to claim 4,
wherein the first range is set to be a narrower angle range as the rotational speed of the operation part becomes higher.

6. The haptic device according to claim 1,
wherein the low-pass filter part sets a cutoff frequency to be lower when the rotation position is in the first range than when the rotation position is in the second range or the third range.

7. The haptic device according to claim 1,
wherein the low-pass filter part sets an attenuation rate at equal to or higher than a cutoff frequency to be higher when the rotation position is in the first range than when the rotation position is in the second range or the third range.

8. The haptic device according to claim 1,
wherein the low-pass filter part outputs the drive signal generated by the signal generation part to the biasing part by attenuating the high-frequency component of the drive signal only when the rotation position is in the first range.

9. The haptic device according to claim 1,
wherein the biasing part includes a brushless motor.

10. A haptic device, comprising:
an operation part capable of being operated to travel along one direction;
a detection part configured to detect a travel position of the operation part;
a biasing part capable of biasing the operation part along the one direction;
a signal generation part configured to generate a drive signal to the biasing part based on the travel position; and
a low-pass filter part configured to output the drive signal to the biasing part by attenuating a high-frequency component of the drive signal,
wherein when the travel position of the operation part is located between a first position and a second position that is on one side of the first position in the one direction, the signal generation part generates the drive signal for causing the biasing part to perform biasing to the other side in the one direction,
wherein when the travel position is located between the first position and a third position that is on the other side of the first position, the signal generation part generates the drive signal for causing the biasing part to perform biasing to the one side in the one direction, and
wherein the low-pass filter part attenuates the high-frequency component of the drive signal more strongly when the travel position is in a first range including the first position and not including the second position and the third position than when the travel position is in a second range including the second position and outside the first range or when the travel position is in a third range including the third position and outside the first range and outside the second range.

11. A haptic method for a haptic device, the haptic device including:
- an operation part capable of being operated to rotate;
- a detection part configured to detect a rotation position of the operation part;
- a biasing part capable of biasing the operation part along a rotation direction of the operation part;
- a signal generation part configured to generate a drive signal for driving the biasing part based on the rotation position; and
- a low-pass filter part configured to output the drive signal to the biasing part by attenuating a high-frequency component of the drive signal, the haptic method comprising:
- when the rotation position is located between a first position and a second position that is on one side of the first position in the rotation direction, causing the signal generation part to generate the drive signal for causing the biasing part to perform biasing to the other side in the rotation direction;
- when the rotation position is located between the first position and a third position that is on the other side of the first position in the rotation direction, causing the signal generation part to generate the drive signal for causing the biasing part to perform biasing to the one side; and
- causing the low-pass filter part to attenuate the high-frequency component of the drive signal more strongly when the rotation position is in a first range including the first position and not including the second position and the third position than when the rotation position is in a second range including the second position and outside the first range, or when the rotation position is in a third range including the third position and outside the first range and outside the second range.

* * * * *